United States Patent [19]

Pohl et al.

[11] Patent Number: 4,794,098

[45] Date of Patent: Dec. 27, 1988

[54] PROCESS FOR THE STABILIZATION OF ACTIVATED CATALYST MASSES

[75] Inventors: Joachim Pohl, Duesseldorf; Franz-Josef Carduck, Haan; Gerd Goebel, Erkrath, all of Fed. Rep. of Germany

[73] Assignee: Henkel Kommanditgesellschaft auf Aktien, Duesseldorf, Fed. Rep. of Germany

[21] Appl. No.: 62,275

[22] Filed: Jun. 15, 1987

[30] Foreign Application Priority Data

Jun. 16, 1986 [DE] Fed. Rep. of Germany ....... 3620275

[51] Int. Cl.$^4$ .......................... B01J 31/26; B01J 33/00
[52] U.S. Cl. ...................................... 502/172; 502/33; 502/173; 502/500; 502/301
[58] Field of Search ............... 502/307, 318, 319, 172, 502/173, 33, 53, 301, 343, 500

[56] References Cited

U.S. PATENT DOCUMENTS 2,865,865 12/1958 Ockrent et al. .................... 502/172
4,234,462 11/1980 Bondar et al. ..................... 502/307

FOREIGN PATENT DOCUMENTS 1160437 1/1964 Fed. Rep. of Germany ...... 502/173
1028799 5/1966 United Kingdom ............... 502/307
1097372 6/1984 U.S.S.R. ............................. 502/53

*Primary Examiner*—Paul E. Konopka
*Attorney, Agent, or Firm*—Ernest G. Szoke; Henry E. Millson, Jr.

[57] ABSTRACT

A process for the stabilization of particulate, activated catalyst masses after the activation of the starting catalyst masses in a gas stream, wherein the particulate, activated catalyst masses are removed from the activation reactor in an inert gas atmosphere into a liquid alcohol or a mixture of two or more alcohols which are straight-chain or branched-chain alcohols containing from 6 to 12 carbon atoms in the alkyl radical, stabilizing the catalyst masses by impregnation with the alcohol or the alcohol mixture, optionally storing and/or transporting the alcohol-impregnated catalyst masses, removing excess alcohol, sieving the alcohol-moist catalyst mass, and introducing the catalyst mass into a catalysis reactor to form a catalyst filling.

29 Claims, No Drawings

PROCESS FOR THE STABILIZATION OF ACTIVATED CATALYST MASSES

BACKGROUND OF THE INVENTION

1. Field of the Invention

This invention relates to a process for the stabilization of activated catalyst masses after the activation of the starting catalyst mass in a gas stream.

2. Statement of Related Art

Particulate catalyst masses, particularly those which have been tabletted, extruded or otherwise pelletized, are widely used on an industrial scale. Such catalyst masses are generally masses of one or more catalytically active components which may contain inert supporting materials. Particularly well known catalysts are metal and metal-support catalysts which are required and used for numerous hydrogenation processes.

Before they are used in the hydrogenation process, catalysts of this type are normally reductively activated by treatment in a reducing atmosphere, more especially in hydrogen or in a gas mixture containing more or less large quantities of hydrogen. The resulting catalyst masses are extremely sensitive to air, as reflected in a distinct reduction in their hydrogenation activity and also in pyrophoric behavior. Accordingly, the production and, in some cases, the storage and transport of highly active catalyst masses such as these, as well as their practical application involves considerable complications and imposes very stringent demands with respect to the need to work in an oxygen-free atmosphere.

It is known in practice that these problems can be overcome in various ways. Thus, air-sensitive, active catalysts can be prepared away from the point of use and the time of use by stabilizing the active hydrogenation catalysts by impregnation with hard fat, hard paraffin, fatty amine or similar compounds. Thus, East German Patent No. 150 390, for example, describes a process for the production of catalysts which consists of pyrophoric nickel metal, optionally on inorganic supports, and which are impregnated with substances melting above 313° K. (40° C). Using this process, the molten suspensions of catalyst and impregnating agent are converted by spraying and simultaneous cooling into a fine grained, free-flowing and air-stable form.

French Patent No. 15 55 015 describes powder-form Raney nickel catalysts which are coated with a protective layer formed by materials having melting points of from 60° to 100° C., more especially hydrogenated vegetable oils, fatty acids or fatty acid salts, glycols, polyfunctional alcohols and organic polymers. These solid layers which prevent the entry of air and which melt at elevated temperatures are said to be applied to the catalyst masses by means of a solvent. Processes such as these for stabilizing activated, particulate catalysts were only used to a limited extent in practice due to the disadvantages involved. These disadvantages are, in particular, the fact that the shaped catalyst elements surrounded by a protective solid increase in volume by comparison with the unimpregnated catalyst elements and, on charging of the reactor for the hydrogenation reaction to be catalyzed, lead to a loss of capacity because the impregnating layers are removed in the course of the hydrogenation process so that the original complete filling intended for the interior of the particular reactor contracts to a partial filling. Unused space unfilled by catalyst mass thus forms in the reactor. This "shrinkage" of the catalyst-protecting layer considerably reduces the potential volume/time yield of the particular process. In addition, the reaction products are contaminated by more or less large quantities of the molten or dissolved impregnating agent, so that the contaminating impregnating agents have to be separated off, at least for the first batches of product.

In view of these disadvantages, catalytic processes of the type used on an industrial scale have resorted to in situ activation of the catalyst charge or filling of a reactor in which, immediately before their use, the particulate catalysts are activated in a reducing gas stream in the reactor from the correspondingly shaped, particulate catalyst masses. This procedure is applied, for example, to copper-chromium and copper-zinc catalysts for the hydrogenation of triglycerides, fatty acid esters and free fatty acids with hydrogen. The particulate catalyst masses containing readily reducible copper oxide are subjected to reduction with hydrogen-containing gas mixtures, as a result of which the copper oxide is converted into finely divided metallic copper. Apart from the fact that the catalyst masses formed are particularly pyrophoric, the shaped elements (tablets, extrudates or pellets) undergo a shrinkage in volume of up to 30%. Accordingly, the catalyst layer which completely fills the interior of the reactor before the beginning of the reducing activation process shrinks by up to 30% during the hydrogenation process, resulting also in an empty reactor volume which is not available to the hydrogenation reaction to be catalyzed. Once again, the potential volume/time yield of the reactor is drastically reduced.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide an improved process which can be generally applied to catalyst masses of different composition and by means of which particulate, highly active catalyst masses can be stabilized. At the same time, the invention seeks to significantly improve the storability of the catalyst masses in the presence of air so that the shaped catalyst elements can be stored for prolonged periods under normal conditions. In particular, the invention seeks to enable the catalyst masses resulting from the process to be stored outside the reactor and to be transported to the point of use without any disadvantages, for example in the form of losses of activity or the risk of pyrophoric reactions. In addition, the invention seeks to ensure that, after the reactor has been charged with them, the catalyst masses do not undergo any shrinkage in volume so that the available capacity of the catalyst is fully utilized by a catalyst charge which completely fills the interior of the reactor.

Accordingly, the present invention relates to a process for the stabilization of particulate, activated catalyst masses after the activation of the starting catalyst mass in a gas stream wherein the particulate, activated starting catalyst masses are removed from the activation reactor in an inert gas atmosphere into a liquid alcohol or into a mixture of two or more alcohols which are straight-chain or branched-chain alcohols containing from 6 to 12 carbon atoms in the alkyl radical; the catalyst masses are impregnated with the alcohol or the alcohol mixture; the alcohol-impregnated catalyst masses are optionally stored and/or transported in the alcohol-impregnated condition; the excess alcohol is removed; the alcohol-moist catalyst masses are sieved, and are then introduced into the catalysis reactor to form a catalyst filling.

In an activation step carried out before the process of the invention is applied, the particulate catalyst starting masses used in the process of the invention are converted from the catalytically inactive state into a catalytically active state by known methods. This is done in known manner by treatment with a reducing gas stream; either pure reducing gases or gas mixtures containing reducing gases can be used for reduction. Hydrogen is normally used as the reducing gas. Accordingly, the reducing gas mixtures can consist of pure hydrogen or of gas mixtures containing hydrogen in any quantities by volume in conjunction with other, non-reducing gases, such as nitrogen for example. The activation step can be carried out in the absence of pressure or under pressure, depending on the starting catalyst mass. The temperatures applied are normally in the range of from 20° to 250° C., depending on the starting catalyst mass.

Suitable starting catalyst masses are any of the mixtures based on various metal compounds which are described in detail in the prior art; oxides, hydroxides, carbonates, basic carbonates, and the like being of particular practical significance. The starting masses are normally converted by tabletting, extrusion or pelletizing into solid shaped forms which are then converted by reduction, again in known manner, into the particulate, activated catalyst starting masses. As known from the prior art, particulate, activated catalyst starting masses such as these consist of shaped components having an average particle size of from 0.5 to 20 mm, preferably from 2 to 10 mm and more preferably from 3 to 8 mm. The spatial form of the particulate, activated catalyst starting material may be regular or irregular.

In one preferred embodiment of the process of the invention, copper/chromium or copper/zinc hydrogenation catalysts are used as the particulate catalyst masses activated in the hydrogencontaining gas stream. Hydrogenation catalysts such as these are known as such for the catalytic hydrogenation of triglycerides, fatty acid esters and free fatty acids with hydrogen, although it has not hitherto been possible to satisfactorily stabilize them against reoxidation. Accordingly, they have been activated by reduction in situ, i.e. in the hydrogenation reactor, resulting in the reduction in the volume of the shaped elements by up to 30%. However, shaped copper/chromium and copper/zinc catalyst elements can be stabilized particularly effectively against reoxidation by the process of the invention away from the hydrogenation reactor, so that the disadvantage of shrinkage of the shaped elements in the hydrogenation reactor does not arise and the hydrogenation reactor can be fully charged with a catalyst filling.

The particulate, activated catalyst starting masses are removed from the activation reactor, in which they are converted from the inactive state into the catalytically active state, in an inert gas atmosphere. Nitrogen is preferably used as the inert gas. However, it is also possible to use other suitable inert gases, such as argon for example, or even inert gas mixtures.

As described above, in the process of the invention the particulate, activated catalyst starting masses are let off into a liquid alcohol or into a mixture of two or more alcohols which are straight-chain or branched-chain alkanols containing from 6 to 12 carbon atoms in the alkyl radical. Accordingly, suitable alcohols are straight-chain or branched-chain hexanols, heptanols, octanols, nonanols, decanols, undecanols, or dodecanols. Individual alcohols from the above group can be used as the liquid medium, although a mixture of two or more of the alcohols from the above group can also be used as the liquid medium.

Alternatively, contact with the alkanol or alkanol mixture can be carried out in the activation reactor itself, and the alkanol-impregnated catalyst then removed from the activation reactor. It is preferred, however, to remove the activated catalyst mass from the activation reactor under an inert atmosphere and then contact the activated catalyst mass with the alkanol or alkanol mixture.

In one preferred embodiment of the process of the invention, the particulate, activated catalyst starting masses are let off in an inert gas atmosphere into a straight-chain or branched-chain alcohol or a mixture of two or more alcohols which are alkanols containing from 10 to 12 carbon atoms in the alkyl radical. It is particularly preferred to use mixtures of several straight-chain alcohols containing from 10 to 12 carbon atoms in the alkyl radical, of the type accumulating as first-cut fatty alcohols in the industrial production of fatty alcohols, as the collecting medium for stabilizing the catalyst masses. For example, it is possible to use so-called $C_{12}$ first-cut fatty alcohol, which consists mainly of n-dodecanol.

In the process of the invention, the particulate, activated catalyst starting masses are impregnated with the alcohol or alcohol mixture. The impregnation process can comprise fully impregnating each catalyst element with the alcohol or alcohol mixture or impregnating only an outer layer of the catalyst element, so that the interior of the shaped element is effectively protected against reoxidation. The particular degree of impregnation applied in the process of the invention can be adapted to meet particular requirements and enables those skilled in this art to consider different strengths and porosities of the shaped catalyst elements. Impregnation times ranging from 1 hour to 50 days can be applied in each individual case, although an impregnation time of from 1 to 30 hours is normally sufficient to fully protect the catalyst mass.

If desired, the alcohol-impregnated catalyst masses can be stored or transported in the alcohol or in the alcohol mixture into which they were let off. In this case, the impregnation times naturally correspond to the storage time or transport time. Leaving the catalyst masses in the alcohol or alcohol mixture, particularly throughout the entire period of storage and/or transport, is a preferred embodiment of the process of the invention, which is accompanied by the advantage that the particulate, activated catalyst starting masses are given the best possible protection against reoxidation and the catalysts are not in any danger of losing activity. In addition, it is ensured in this way that the shaped catalyst elements do not come into contact with oxygen and/or ignite. Immediately before use, i.e. before introduction into the reactor intended for the catalytic reaction, the excess liquid is removed from the stabilized, particulate catalyst masses. The alcohols used for stabilization can be freed from excess liquid, for example, by decanting off, pouring off, draining off or pumping off the alcohol or alcohol mixture used for stabilization. In practice, it has proved to be particularly effective to remove the liquid phase by pumping off.

The alcohol-moist catalyst masses can be handled in air without any danger of a pyrophoric reaction or deactivation of the catalyst in air. This shows most impressively the extent to which the liquid alcohol stabilizes the catalyst masses or shaped elements against reoxidation. The catalyst masses are normally sieved and then introduced into the catalysis reactor to form a catalyst filling.

The particulate copper-chromium and copper/zinc catalyst masses stabilized by the process of the invention form a filling which does not shrink in volume and which shows excellent activity and selectivity in the subsequent hydrogenation of triglycerides, fatty acid esters or free fatty acids with hydrogen, giving far better results than catalyst masses reduced in situ. In particular, the overall capacity of the hydrogenation reactor can be utilized by a 100% filling with shaped catalyst elements so that the volume/time yield obtainable in theory can be substantially achieved. The hydrogenation reaction can be continued without reactivation of the catalyst material and the shaped catalyst elements show uniform activity and selectivity throughout the entire hydrogenation process. Even prolonged storage and transport times do not affect the activated catalyst masses. Reoxidation by air does not occur, even when the catalyst masses are handled in air rather than in an inert gas atmosphere.

The invention is illustrated but not limited by the following Examples.

EXAMPLE 1

700 ml of a barium-doped catalyst based on copper/zinc (3 mm diameter tablets) suitable for the hydrogenation of fatty acid methyl esters was reduced under the following conditions in a tube reactor:

GHSV*: 2000 h$^{-1}$;
Reducing gas: H$_2$ in N$_2$, 1% by vol. max.;
Pressure: 2 bar;
Temperature: rising from 130° C. to 200° C. in stages of 10° C./h; 12 h at 200° C.
*Gaseous hourly space velocity The catalyst starting material thus activated was let off in a stream of nitrogen into C$_{12}$ first-cut alcohol. The catalyst tablets were left in the liquid for 24 hours. The C$_{12}$ first-cut alcohol was then pumped off, the impregnated tablets were sieved and were then introduced in alcohol-moist form into a high-pressure reactor.

Using the catalyst tablets produced in this way, C$_{12}$-C$_{18}$ methyl ester was hydrogenated under the following conditions without need for reactivation of the catalyst:

H$_2$: 250 bar;
Temperature: 230° C.;
LHSV*: 5 h$^{-1}$
Conversion: 97% and
Hydrogenation time: 120 h
* Liquid hourly space velocity The catalyst tablets remained mechanically stable and showed uniform activity and selectivity throughout the entire hydrogenation period. The product drained off was clear. 97% of the product obtained consisted of C$_{12}$-C$_{18}$ fatty alcohol.

EXAMPLE 2

700 ml of a barium- and manganese-doped copper chromite catalyst (4 mm diameter tablets; composition: 36±0.5% copper, 29±0.5% chromium, 1.7±0.5% barium, 2.5±0.5% manganese and 1±0.3% SiO$_2$) suitable for the direct hydrogenation of triglycerides were reduced in a tube reactor under the conditions described in Example 1.

The catalyst tablets thus reduced were let off in a stream of nitrogen into C$_{12}$ first-cut alcohol consisting mainly of n-dodecanol. The tablets were left in the liquid for 24 hours. The alcohol mixture was then pumped off and the alcohol-moist tablets were sieved and introduced into a high-pressure hydrogenation reactor.

Without any need for reactivation, coconut oil was hydrogenated under the following conditions:

H$_2$ pressure: 250 bar;
Temperature: 220° C.;
LHSV: 1 h$^{-1}$;
Conversion: 47.5%
Hydrogenation time: 120 h The catalyst tablets retained their stability over the entire reaction time. The product drained off was clear; 47.5% of the product obtained consisted of C$_{12}$-C$_{18}$ fatty alcohol.

We claim:

1. A process for the stabilization of a particulate hydrogenation catalyst mass after the activation thereof in a reducing activating gas stream, comprising the steps of
   (a) contacting the particulate, activated catalyst mass in an inert gas atmosphere with an at least stabilizing quantity of at least one liquid straight chain or branched chain alkanol containing from 6 to 12 carbon atoms for a time sufficient to impregnate the catalyst mass with the alcohol to stabilize it against oxidation upon contact with air;
   (b) removing excess alkanol from the catalyst mass; and
   (c) introducing the resulting catalyst mass into a catalysis reactor.

2. The process of claim 1 wherein shaped catalyst particles are used as the particulate catalyst mass.

3. The process of claim 2 wherein tablets, extrudates, or pellets are used as the shaped catalyst particles.

4. The process of claim 1 wherein a catalyst mass activated by reduction in an H$_2$-containing gas stream is used therein.

5. The process of claim 1 wherein a particulate catalyst mass of copper/chromium or copper/zinc hydrogenation catalyst activated in a hydrogen-containing gas stream is used therein.

6. The process of claim 1 wherein in step (a) the inert gas atmosphere is a nitrogen atmosphere.

7. The process of claim 1 wherein the at least one straight chain or branched chain alkanol contains from 10 to 12 carbon atoms.

8. The process of claim 7 wherein a mixture of alkanols is employed therein.

9. The process of claim 1 wherein in step (b) excess alkanol is removed by being decanted off, poured off, drained off, or pumped off.

10. The process of claim 1 wherein in step (a) the alkanol is contacted with the catalyst mass for a period of from about 1 hour to about 50 days.

11. The process of claim 10 wherein the period is from about 1 hour to about 30 hours.

12. A process for stabilizing and storing and/or transporting a particulate, activated hydrogenation catalyst mass after the activation thereof in a reducing activating gas stream, comprising the steps of
   (a) contacting the particulate, activated catalyst mass in an inert gas atmosphere with an at least stabilizing quantity of at least one liquid straight chain or branched chain alkanol containing from 6 to 12 carbon atoms for a time sufficient to impregnate the catalyst mass with the alcohol to stabilize it against oxidation upon contact with air; and
   (b) storing and/or transporting the resulting stabilized catalyst mass.

13. The process of claim 12 wherein an excess of said at least one alkanol is employed in step (a), and step (b) is carried out in the presence of the excess alkanol.

14. The process of claim 12 wherein the total contact time in step (a) and (b) between the alkanol and the catalyst mass is a period of from about 1 hour to about 50 days.

15. The process of claim 14 wherein the period is from about 1 hour to about 30 hours.

16. A process for the stabilization of a particulate hydrogenation catalyst mass after the activation thereof in a reducing activating gas stream, comprising the steps of
   (a) contacting the particulate, activated catalyst mass in an inert atmosphere with an at least stabilizing quantity of at least one liquid straight chain or branched chain alkanol containing from 6 to 12 carbon atoms for a time sufficient to impregnate the catalyst mass with the alcohol to stabilize it against oxidation upon contact with air;
   (b) storing and/or transporting the stabilized catalyst mass;
   (c) removing excess alkanol from the stabilized catalyst mass;
   (d) sieving the alkanol-moist stabilized catalyst mass to obtain the desired particle size therefor; and
   (e) introducing the resulting alkanol-moist stabilized catalyst mass into a catalysis reactor.

17. The process of claim 16 wherein shaped catalyst particles are used as the particulate catalyst mass.

18. The process of claim 17 wherein tablets, extrudates, or pellets are used as the shaped catalyst particles.

19. The process of claim 16 wherein a catalyst mass activated by reduction in an $H_2$-containing gas stream is used therein.

20. The process of claim 16 wherein a particulate catalyst mass of copper/chromium or copper/zinc hydrogenation catalyst activated in a hydrogen-containing gas stream is used therein.

21. The process of claim 16 wherein in step (a) the inert gas atmosphere is a nitrogen atmosphere.

22. The process of claim 16 wherein the at least one straight chain or branched chain alkanol contains from 10 to 12 carbon atoms.

23. The process of claim 22 wherein a mixture of alkanols is employed therein.

24. The process of claim 16 wherein in step (c) excess alkanol is removed by being decanted off, poured off, drained off, or pumped off.

25. The process of claim 16 wherein the total contact time in step (a) and (b) between the alkanol and the catalyst mass is period of from about 1 hour to about 50 days.

26. The process of claim 25 wherein the period is from about 1 hour to about 30 hours.

27. A process for the stabilization of a particulate hydrogenation catalyst mass after the activation thereof in a reducing activating gas stream, comprising the steps of
   (a) contacting a particulate catalyst mass of a copper/chromium or copper/zinc hydrogenation catalyst activated in a $H_2$-containing gas stream in a nitrogen atmosphere with an at least stabilizing quantity of at least one liquid straight chain or branched chain alkanol containing from 10 to 12 carbon atoms for a time sufficient to impregnate the catalyst mass with the alcohol to stabilize it against oxidation upon contact with air;
   (b) storing and/or transporting the stabilized catalyst mass in the presence of air;
   (c) removing excess alkanol from the stabilized catalyst mass;
   (d) sieving the alkanol-moist stabilized catalyst mass; and
   (e) introducing the resulting alkanol-moist stabilized catalyst mass into a catalysis reactor.

28. The process of claim 27 wherein the total contact time in step (a) and (b) between the alkanol and the catalyst mass is a period of from about 1 hour to about 50 days.

29. The process of claim 28 wherein the period is from about 1 hour to about 30 hours.

* * * * *